United States Patent
Fang et al.

(10) Patent No.: US 9,449,253 B2
(45) Date of Patent: Sep. 20, 2016

(54) LEARNING PAINTING STYLES FOR PAINTERLY RENDERING

(75) Inventors: Hui Fang, Jiangsu (CN); Genzhi Ye, Beijing (CN)

(73) Assignee: Google Inc., Mountain View, CA (US)

( * ) Notice: Subject to any disclaimer, the term of this patent is extended or adjusted under 35 U.S.C. 154(b) by 153 days.

(21) Appl. No.: 14/372,444

(22) PCT Filed: Jan. 16, 2012

(86) PCT No.: PCT/CN2012/070423
§ 371 (c)(1),
(2), (4) Date: Jan. 16, 2015

(87) PCT Pub. No.: WO2013/106984
PCT Pub. Date: Jul. 25, 2013

(65) Prior Publication Data
US 2015/0310305 A1    Oct. 29, 2015

(51) Int. Cl.
G06K 9/52 (2006.01)
G06T 11/00 (2006.01)
G06K 9/46 (2006.01)
G06K 9/62 (2006.01)
G06T 11/20 (2006.01)

(52) U.S. Cl.
CPC . *G06K 9/52* (2013.01); *G06K 9/46* (2013.01); *G06K 9/4652* (2013.01); *G06K 9/4661* (2013.01); *G06K 9/6267* (2013.01); *G06T 11/001* (2013.01); *G06T 11/20* (2013.01); *G06K 2009/4666* (2013.01)

(58) Field of Classification Search
None
See application file for complete search history.

(56) References Cited

U.S. PATENT DOCUMENTS

| | | | |
|---|---|---|---|
| 8,144,789 B2* | 3/2012 | Tasaka | H04N 19/172 345/589 |
| 8,212,936 B2* | 7/2012 | Kobayashi | H04N 5/57 345/589 |
| 2002/0118209 A1* | 8/2002 | Hylen | G03B 1/48 345/582 |
| 2009/0033602 A1 | 2/2009 | Murrah et al. | |
| 2010/0013842 A1 | 1/2010 | Green et al. | |

FOREIGN PATENT DOCUMENTS

| | | |
|---|---|---|
| CN | 101799931 A | 8/2010 |
| CN | 101930614 A | 12/2010 |

* cited by examiner

*Primary Examiner* — Ashish K Thomas
(74) *Attorney, Agent, or Firm* — McDermott Will & Emery LLP

(57) ABSTRACT

Embodiments relate to automatic rendering of images according to a painting style. A procedural painting system, controlled by one or more parameters is used. Classifiers are trained using machine learning to return a score related to how well an image fits a given painting style. Parameters of the procedural painting system are optimized to maximize the score returned by the classifiers, and an output image is rendered.

18 Claims, 11 Drawing Sheets

LEARNING PAINTING STYLES FOR PAINTERLY RENDERING

BACKGROUND

1. Field

The present disclosure generally relates to automatic painting of images.

2. Background

Generating a painting from a photograph has been a popular research subject. Various painting styles have been simulated with pleasant results, such as watercolor, impressionism, pencil sketching, etc. However, these approaches usually share one thing in common: a person or computer scientist with some taste. A human must examine paintings of interest, summarize the characteristics of the painting styles involved, and translate the characteristics into an algorithm. As the algorithm is refined, the computer scientist may need to evaluate the current painting quality of the algorithm and tweak certain parameters until the results satisfy her eyes. This time-consuming process may be repeated for every painting style she wants to simulate, and the quality of the results is bounded by her artistic taste.

BRIEF SUMMARY

The present disclosure generally relates to automatically painting an image according to a desired painting style. In an embodiment, a method of automatically painting an image according to a desired painting style is disclosed. A painting style is received, and a classifier is trained to calculate a score based on how well an image corresponds to the received painting style. An input image is received. A base output image, based on the input image, is rendered by a procedural painting system controlled by one or more parameters. A score is calculated for the base output image using the trained classifier. Then, one or more meta-parameters are optimized, where each meta-parameter includes one or more parameters. An intermediate output image is rendered by the procedural painting system, based on the base output image, and where the parameters of the procedural painting system are determined based on the optimization of the meta-parameters. The intermediate output image is scored using the trained classifier. One or more of the individual parameters are optimized based on the calculated score, and a final output image is rendered by the procedural painting system, where the parameters are determined based on the optimization.

Systems and computer program products to automatically paint an image according to a desired painting style are also disclosed.

Further embodiments, features, and advantages of the invention, as well as the structure and operation of the various embodiments of the invention are described in detail below with reference to accompanying drawings.

BRIEF DESCRIPTION OF THE FIGURES

Certain embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
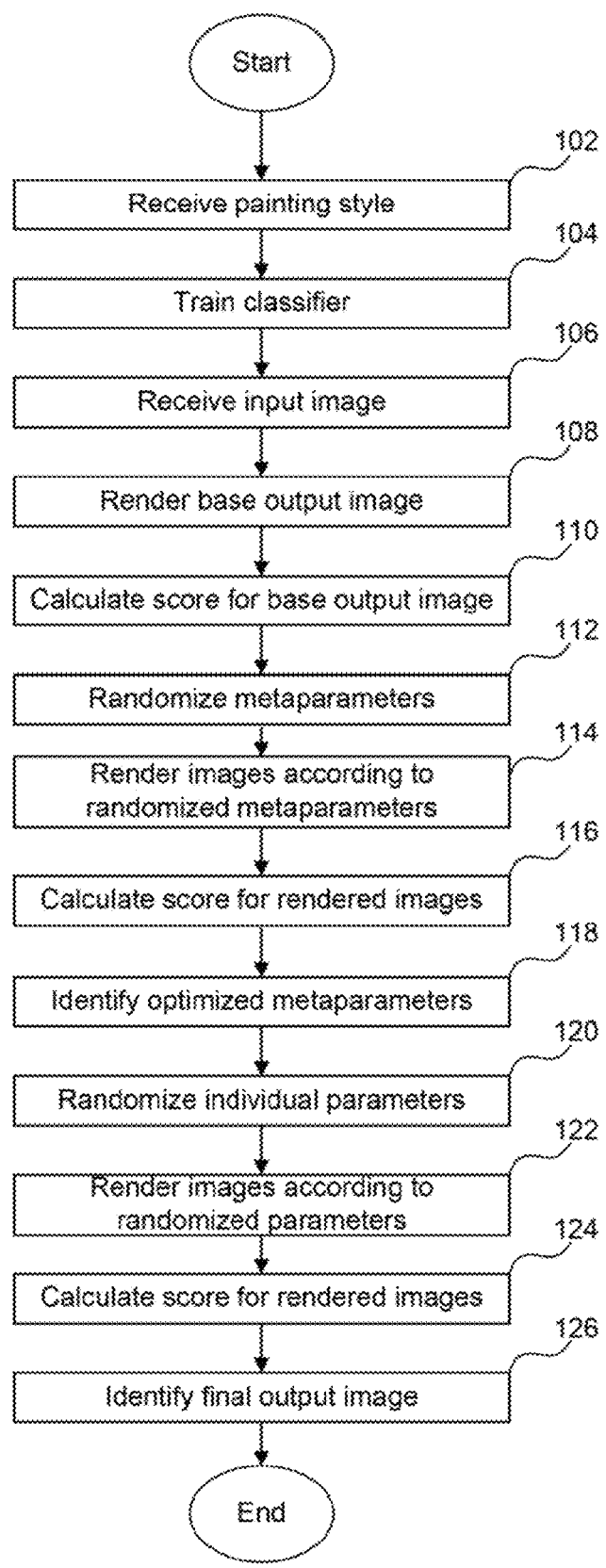
FIG. 1 is a flow diagram of a method of painting an image according to a painting style in accordance with an embodiment.

Table of Contents:

Method
Training a Classifier
System
Procedural Painting System
    Brush Generation
    Two-Level Painting and the Edge Layer
    Optimizable Parameters of Painting System
Optimization of Painting Styles
Examples While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of the certain embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it could be within the knowledge of one skilled in the art to effect such feature, structure, or characteristic in connection with other embodiments whether or not explicitly described.

Disclosed herein are methods and systems of automatically painting an image according to a painting style without requiring human input or judgment. In an embodiment, in order to eliminate the human aspect, a style metric is developed that judges how well an image matches a particular painting style. Further, an optimizer is used which fine-tunes a procedural painting system to return a higher score from the style metric.

Machine learning is widely used for classification purposes in computer vision. However, machine learning has not been used as often in computer graphics. In a high-dimensional feature space, machine learning algorithms may be capable of capturing some concepts that elude words or explicitly designed algorithms, such as in the area of face recognition. An embodiment utilizes an AdaBoost machine learning algorithm to classify image features for painting style detection. An embodiment utilizes multiple classifiers, which are robust enough to guide an optimization system based on the abstract concept of painting style.

Additionally, a procedural painting system is used in an embodiment. The behavior of the procedural painting system is controlled by a number of parameters. These parameters may be linked to an optimizer. With each permutation of the parameters, the optimizer may generates a variation of a painting from an input photograph. AdaBoost classifiers, as described herein, may be used to score the painting based on its painting style. This score is the objective function for the optimizer to maximize.

Many techniques exist in non-photo realistic rendering (NPR) that generate different special effects on rendered images. For example, various methods have been proposed to simulate different painting styles on images or videos, such as for watercolor, pen and ink, impressionism, cartoon, and others. Stroke-based rendering has been found to be successful in mimicking brush textures of real paintings by simulating the process of applying brush strokes based on image features. However, these techniques generally require significant human intervention during the refinement of the results towards a person's subjective understanding of a painting style.

Texture synthesis produces similar textures using examples. Some methods can also be used for image editing. Image analogies use one image as a "feature map" to guide the synthesis process, with which artistic filters can be achieved. However, the results of these systems may be less satisfying for the non-photo realistic rendering purpose due to noise and a lack of expression compared to stroke-based rendering.

AdaBoost, or adaptive boost, is a popular machine learning technique that learns a strong classifier from positive and negative examples given multiple weak classifiers. An embodiment utilizes AdaBoost to develop a strong classifier as the objective function for an optimizer.

An embodiment here uses several color and texture based classifiers to detect styles and also to guide an optimization process.

Method

FIG. 1 is a flow diagram of a method 100 of painting an image according to a desired painting style. Further details of the individual elements of method 100 are described herein.

At stage 102, a particular painting style is received. The painting style may be received from a user who wishes to create an image rendered according to a particular painting style. The painting style may specify, for example and without limitation, a particular artist, such as Cezanne or Van Gogh. The painting style may also specify a type of painting, such as pencil sketch drawings. Further, the painting style may be received in response to a user providing a number of images in a desired painting style.

At stage 104, a classifier is trained, which returns a score related to how well a particular image fits the received training style. The classifier may be trained using a machine learning algorithm such as AdaBoost, as is described further herein.

At stage 106, an input image is received. The input image may be received, for example and without limitation, from a user. The input image may be a photograph or any other type of image. Further, the input image may be any format for a computer image file, for example and without limitation, a JPEG, GIF, BMP, PNG, TIFF or other image file format.

As described in further detail herein, a procedural painting system controlled by one or more parameters may be used to paint images according to a particular style. At stage 108, a base output image is rendered by a procedural painting system. The procedural painting system may be controlled by one or more parameters, as is described in further detail herein. The values used for the parameters of the procedural painting system may be previously set default parameters that do not correspond to any particular painting style.

At stage 110, a score is calculated for the base output image. The score may be calculated by the classifier trained as a result of block 104. The score may represent how well the base output image corresponds to the received painting style. Examples and further description of score calculation are discussed further below.

At stage 112, a number of meta-parameters of the procedural painting system are randomized to determine sets of different values for the meta-parameters. The meta-parameters of the procedural painting system may include one or more of the individual parameters of the procedural painting system. Examples and further description of such meta-parameters and optimization are discussed further below. As an example of the randomization at stage 112, the meta-parameters may be randomized in 100 ways, and 100 different sets of meta-parameters may be determined.

At stage 114, images are rendered according to the sets of meta-parameter values determined at stage 108. For example, if 100 sets of meta-parameters have been determined, 100 images are rendered at stage 114.

At stage 116, scores are calculated for the images rendered at stage 114. The scores may be calculated by the classifier trained as a result of stage 104. The score may represent how well the rendered image corresponds to the received painting style.

At stage 118, the meta-parameters for the image with the optimal score determined at stage 116 are identified as the optimized meta-parameters for the particular painting style. The optimal score may be the highest or lowest score returned by the classifier, depending on the implementation of the classifier.

At stage 120, the individual parameters of the procedural painting system are randomized to determine sets of different values for the parameters. As an example of the randomization at stage 120, the parameters of the procedural painting system may be randomized in 100 different ways, and 100 different sets of parameters may be determined.

At stage 122, images are rendered according to the sets of randomized parameter values determined at stage 118. For example, if 100 sets of randomized parameter values have been determined, 100 images are rendered at stage 122.

At stage 124, scores are calculated for the images rendered at stage 122. The scores may be calculated by the classifier trained as a result of stage 104. As described with reference to stage 116, the score may represent how well the rendered image corresponds to the received painting style.

At stage 126, a final output image may be identified by choosing the image rendered at stage 122 with the optimal score determined in accordance with stage 124. The final output image may be provided to a user. As above, depending on the implementation of an embodiment, the optimal score may be the highest or lowest score returned by the classifier.

Training a Classifier

Figure 2:
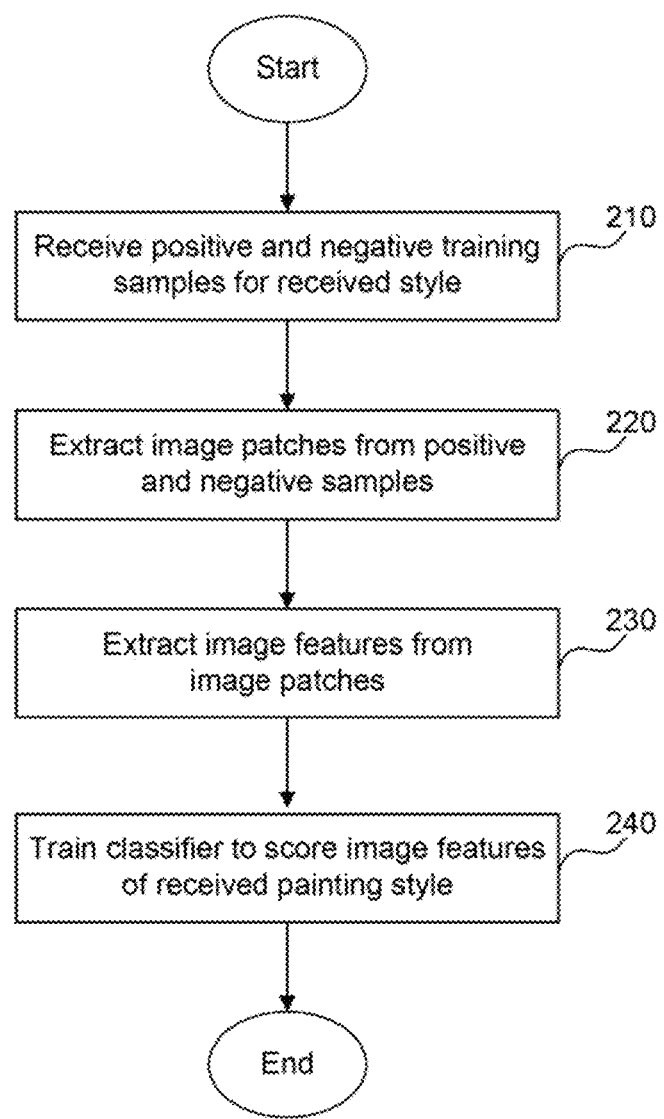
FIG. 2 is a flow diagram of a method of training a classifier in accordance with an embodiment.

FIG. 2 is a flow diagram of a method 200 for training a classifier in accordance with an embodiment. At stage 210, positive and negative training samples for a received style are received. Positive samples correspond to those images that represent desired characteristics of the final output image. For example, positive samples for a desired Van Gogh rendering may be a set of Van Gogh images. In an embodiment, five paintings are used as positive samples.

Negative training samples are also received at stage 210. In an embodiment, a library of 200 paintings corresponding to different painting styles may be maintained. A set of paintings maybe randomly selected from the library as negative samples for the painting style to train. In an embodiment, 20 paintings are randomly selected. In a further embodiment, images are shrunk to a maximum size of 1000 pixels for meaningful comparisons of texture details.

At stage 220, image patches from the positive and negative samples are extracted. In an embodiment, image patches may be 160 pixels wide by 160 pixels high. Further, depending on the implementation of an embodiment, the number of image patches may vary. For example, 500 patches may be used for each training sample. Each patch may be referred to as patch $P_k$ where k is the number of the particular patch.

Using the image patches, image features are extracted from each image patch at stage 230. Four types of image features may be used, based on color, gradient, and texton features of the image, in order to capture different aspects of a painting style.

The color feature may be the spatial pyramid matching kernel (SPMK) of the LAB color space. This color feature may capture the color distribution at different resolution levels on the image. A second color feature may also be used, which captures pixel color deviations using a blurred version of the image with a Gaussian radius of 3 pixels. This feature may be more tolerant to the overall color distance between images. The gradient feature may replace the LAB color space channels in the color SPMK with image gradients. Similarly, the texton features may replace the LAB color space channels in the color SPMK with texton features. The gradient and texton features may be used to capture edge and texture-related features.

Feature vectors $v_{ik}$ for each patch $P_k$, using features $\{F_i\}$, may be found. For these feature vectors, two-class AdaBoost training may be used on all feature vectors $\{v_{ik}, k=1, \ldots, K\}$ of feature $F_i$, separately, where K is the total patch number. In an embodiment, 50 AdaBoost stumps may be found to yield a classifier $C_i$. In an embodiment, other machine learning tools may be used, such as a support vector machine.

Applying a classifier to a feature returns a float value:

$$C_i(\vec{v})=s_i \quad (1)$$

In the traditional classification framework, a threshold t may be applied on the value of $s_i$ to reach a binary decision on whether $\vec{v}$ belongs to the positive samples or negative samples:

$$\vec{v} \text{ belongs to} \begin{cases} \text{positive samples if } s_i=1 \\ \text{negative samples otherwise} \end{cases}$$

After a successful training on a non-trivial dataset, a higher threshold typically leads to a higher precision rate but a lower recall rate. In other words, the higher $s_t$ is, the more likely that feature belongs to the positive sample sets. Such a precision may be at the cost of throwing away more positive samples below the threshold.

In an embodiment, a threshold on $s_i$ may not be used. Instead, the numerical value of $s_i$ may be used directly as the objective for our style optimization. Thus, the higher $s_i$, is, the more likely that the given image patch matches the desired painting style.

To make $s_i$ comparable across multiple classifiers, the output of $C_i(v_{ik})$ is normalized, using the score range from classifier $C_i$ determined on all training image patches such that $$\hat{C}_i(v_{ik})=s_{ik}, s_{ik} \in [0,1] \quad (2)$$

Thus, the score may always range from zero to one. At stage 240 of method 200, the classifier is trained to score image features to return a score between zero and one to determine how well the image features correspond to the given painting style.

System

Figure 3:
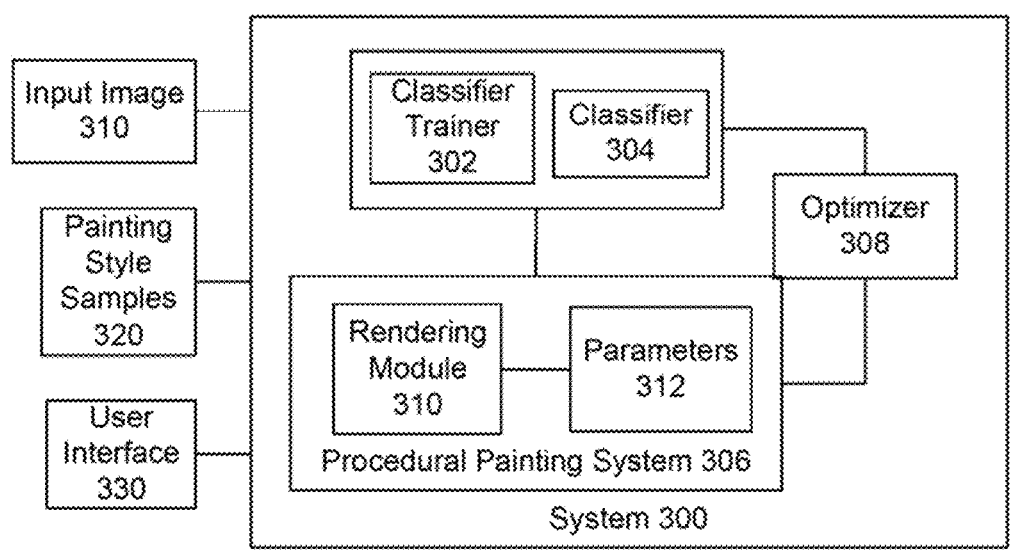
FIG. 3 is a diagram of a system in accordance with an embodiment.

FIG. 3 is a diagram of a system 300 in accordance with an embodiment disclosed herein. Components of system 300 may be used to implement, for example and without limitation, various stages of method 100 or method 200 as described above.

System 300 includes a classifier trainer 302. Classifier trainer 302 may receive negative and positive training samples in accordance with stage 210 of method 200. Classifier trainer 302 may be further configured to extract image patches from the received samples, in accordance with stage 220 of method 200, and further to extract image features from the image patches, in accordance with stage 230 of method 200. Classifier trainer 302 may also be configured to train classifier 304 in accordance with stage 240 of method 200.

System 300 also includes procedural painting system 306. As described herein, procedural painting system 306 is controlled by one or more parameters 312. Parameters 312 may control rendering module 310 of procedural painting system 310 to render a particular image, in accordance with stages 108, 114 and 120 of method 100.

System 300 also includes optimizer 308. Optimizer 308 may operate in conjunction with procedural painting system 306 and classifier 304 to randomize the values of meta-parameters and parameters and may determine optimal meta-parameters and parameters using the score returned by classifier 304, in accordance with stages 112, 118, and 122 of method 100.

System 300 may receive an input image 310. Input image 310 may be a photograph or other image, and may be received by a user. Further, system 300 may be connected to a repository of painting style samples 320. Painting style samples 320 may be used by classifier trainer 302 to train classifier 304 in accordance with an embodiment. Further, system 300 may be connected to user interface 330. User interface 330 may allow a user to view the results of system 300. User interface 330 may also allow a user to select a painting style. Further, user interface 330 may allow a user to view an image, based on input image 310, which has been rendered according to the user's selected painting style.

Procedural Painting System

The procedural painting system used in an embodiment may exhibit two design goals. First, the procedural painting system may be versatile enough such that it can render different painting styles. For example, the procedural painting system may be able to render images similar to those of Van Gogh, and also images similar to those of Cezanne.

Further, in order to operate in accordance with an embodiment described herein, the versatility mentioned above may need to be controlled by various parameters. The parameters, once fed to an optimizer, can be manipulated.

Thus, in an embodiment, a multiple-level painting system may be used. This procedural painting system may exhibit a great deal of freedom in brush control.

Brush Generation

The procedural painting system may paint images using curvilinear patches. Color difference may be measured using L2 distance. L2 distance may also be known as Euclidean length. Color difference may be measured using L2 distance in the RGB color space. Given an input image $I_{orig}$ and an empty canvas $I_{canvas}$ with the same dimensions, painting may be done in scan-line order, starting with the next pixel whose color difference between $I_{orig}$ and $I_{canvas}$ is above a threshold. In an embodiment, a threshold of 30 may be used. Each additional patch may simulate a brush stroke in $I_{canvas}$ based on its color in $I_{orig}$, until the whole canvas is painted. In an embodiment, to avoid painting on a same spot repetitively, each pixel cannot start a new brush if it has been painted twice or more.

To determine the lay-out of the next patch given a starting pixel $P_o$, $P_o$'s location and color $C_o$ in $I_{orig}$ may be used. For all pixels $\{P\}$ within the neighborhood of $P_o$, whose color distance to $C_o$ is below a threshold (30, for example), Principal Component Analysis (PCA) may be used to find the dominating axis $\vec{x}_o$ of their spatial distribution. The set of all pixels $\{P\}$ is then evenly sliced into 5 intervals along the dominating axis $\vec{x}_o$ to form 5 subsets $\{\{P\}_k, k=1\ldots 5\}$. The average pixel location of each $\{P\}_k$ forms the spine of the patch. Ribs of the patch then grow perpendicular to the spine similar to the technique disclosed in "Detail Preserving Shape Deformation in Image Editing" by Hui Fang and John C. Hart. The patch may be smoothed and super-sampled to cover roughly 1-pixel between its neighboring grids. The patch may be further cropped such that the density of pixels belonging to $\{P\}$ within the patch is above a threshold of 90%.

Each patch may be turned into a brush stroke by texture-mapping it with a sample brush texture and modifying its appearance using multiple parameters. Such parameters are described further herein.

Two-Level Painting and the Edge Layer

The image may be painted using two levels of patches. The first level of patches may be of a much larger size to mimic quick sketching of the scene. The second level of smaller patches may only paint on areas where the difference between $I_{canvas}$ and $I_{orig}$ exceeds a threshold, in order to paint finer details. The actual patch size at each level may be determined by the optimizer.

Further, an optional edge layer can be pasted on the top of the canvas. The edge layer may be identical to other two layers expect that it is only allowed to paint within a radius to edges. By reducing brush brightness, edge features in the image may be emphasized.

Optimizable Parameters of Painting System

The optimizer, as described herein, may control the painting system by the following parameters. First, the optimizer may control whether a flag is set that determines whether the edge layer is turned on. Parameters of edge detection may also be controlled by the optimizer, such as a Gaussian blur radius using Sobel edge detector, or edgy dilation or erosion radius for width control.

Additional parameters, such as the following, may be independently adjustable at both the patch levels and the edge layer. The optimizer may control the patch length and the x-y (height-width) ratio to determine the patch's size and shape. Further, the optimizer may control the patch texture. A number of brush textures may be used, depending on their smoothness. In an embodiment, 11 brush textures, ranked in order of decreasing smoothness, may be used. The optimizer may be able to search for similar texture patches at each level of the painting process, and pick one of the textures to enhance brush details.

The optimizer may also control the brightness and saturation shift to brush color of the painting system. The optimizer may increase saturation at the patch level to mimic a particular style, for example.

Further, the optimizer may control the range of brightness and the color variation from brush texture. In the LAB color space, the magnitude of texture variation may be controlled in brightness (L) and color (AB). Two multipliers may be used to control the magnitude of texture variation in brightness and color.

Additional parameters may be used as well. In an embodiment, 25 parameters may be adjusted.

Optimization of Painting Styles

As detailed above, the first optimization of the parameters of the procedural painting system may involve meta-parameters of the procedural painting system. Meta-parameters of the procedural painting system refer to multiple individual parameters of the procedural painting system. This may be done for a number of reasons.

Optimizing individual parameters of the procedural painting system may be difficult and consume too much time. A gradient-based optimizer, such as an optimizer using Conjugate Gradient, makes decisions based on the current local direction towards the minimum of its objective function. In order to make good progress, the potential field of its objective function may need to be relatively smooth in its parameter space.

The optimizer may use the classifiers $\{C_i\}$ trained as described herein for a particular target style, as well as one or more photographs a user wants to generate painting effects for. The optimizer may try various parameters to control the painting system. With each configuration, the painting system generates paintings from input photos.

The performance of the current painting system, with its parameters controlled by the optimizer, may be evaluated by comparing the output of the painting system against the target style. Random patches of 160×160 pixels may be extracted from the output of the painting system. These patches may be scored using the classifier trained as described herein.

The final optimization objective may be the sum of normalized scores from all classifiers on all the patches $\{P_k\}$.

$$\text{Objective} = \sum_i \sum_k \hat{C}_i(P_k) \quad (3)$$

Since a classifier gives a higher score for a positive sample, but an optimizer usually seek a minimum, the sense of positive and negative may be negated during classifier training, such that a lower score means a better match.

In an embodiment, the objective is a score from classifiers trained using AdaBoost. As evidenced by various experiments, the behavior of the objective is highly unknown. For example, in general, it may be seen that smaller patches lead to better classifier scores. However, at a certain level, the patch size no longer matters. For example, it was found that a patch size of 60×60 pixels does not provide a better score than a patch size of 80×80 pixels. Because gradient-based optimizers make decisions using the current local direction, if the optimizer starts at a patch size of 60×60, it is likely that the optimizer will not be guided towards smaller patch sizes.

An alternative is to start optimization at multiple random parameter values. However, as the number of parameters to be controlled by the painting system increase, the volume of the parameter space increases exponentially. If a particular characteristic of a painting style needs to be captured by adjusting k parameters jointly to proper values within $\epsilon D$ of error on each parameter, where D is the valid range of those parameters, then the chance to start near that location will be $\epsilon^k$ This clearly does not scale well with respect to parameter numbers.

Thus, optimization using individual parameters may not be feasible.

Reducing the total number of parameters will help. However, making the parameters as independent as possible, which reduces k in $\epsilon^k$ may also allow quicker optimization of the procedural painting system. For example, instead of changing the parameters of patch width and height, optimizing the patch's maximum size and aspect ratio may be beneficial. Randomly sampling patch maximum size alone may have a better chance to find a better score than randomly sampling both width and height.

Thus, with this observation, a number of meta-parameters, which control other parameters, may be determined. Changing the meta-parameters will produce a meaningful change to the painting results. Optimization may have the goal of maximizing or minimizing the score returned by the classifier.

The first meta-parameter used may be painting smoothness. A larger smoothness value leads to a larger patch size, a smaller color variation value and shift for patches at each patch level, and a smoother brush texture.

Another metaparameter may be image colorfulness. A smaller value for colorfulness may lead to less hue variations and a decrease of saturation in patch color.

Further, edge importance may be used as a meta-parameter. A larger value for edge importance may reduce the brightness of the edge layer for better visibility. The larger value may also increase the brightness of the other image layers to fade them out.

Value ranges of meta-parameters may be between 0 and 1. In turn, the metaparameters linearly interpolate controlled parameters within their valid ranges. That is, for example, if the metaparameter of painting smoothness increases, the patch size also adjusts with a linear relationship.

Optimizing meta-parameters may lead to a coarse simulation of the painting style, and provide a more reasonable set of starting parameter values for the final optimization.

Figure 4A:
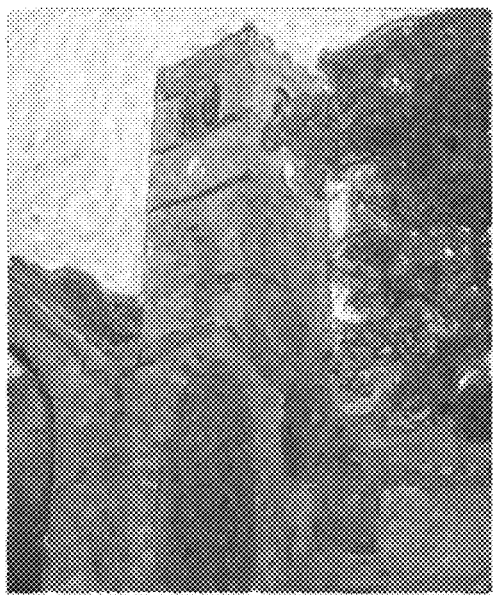
FIG. 4A is an example of an image in color in accordance with an embodiment.
Figure 4B:
FIG. 4B is an example of an image in color in accordance with an embodiment.

Thus, optimization, as described above, contains two stages. In the first stage, only meta-parameters are optimized, which derive values for other parameters. The best score possible as a result of adjusting meta-parameters may be the result of the optimization at the first stage. In the second stage, all other parameters are refined using their values from the first stage as a starting point. In embodiments, the perturbations of the parameters in the second stage forms a distribution that favors smaller changes. FIG. 4A is an example of an image after optimization of meta-parameters, while FIG. 4B is an example of an image after the second stage of optimization, where individual parameters are optimized using the levels set by the metaparameter optimization as the starting point. As seen in FIG. 4B, the second-stage result displays increased brush smoothness and brightness. This may be accomplished by perturbing the first-stage result of FIG. 4A to achieve a better watercolor impression.

Color of results are linearly shifted such that their average brightness and saturation fall within the ranges of training images of that style.

EXAMPLES

FIGS. 5-8 are exemplary image renderings of a procedural painting system trained in accordance with an embodiment disclosed herein. In the examples of FIGS. 5-8, a classifier (such as, classifier 304) was trained on several visually distinctive painting styles, using 5-6 images from each style.

Figure 5:
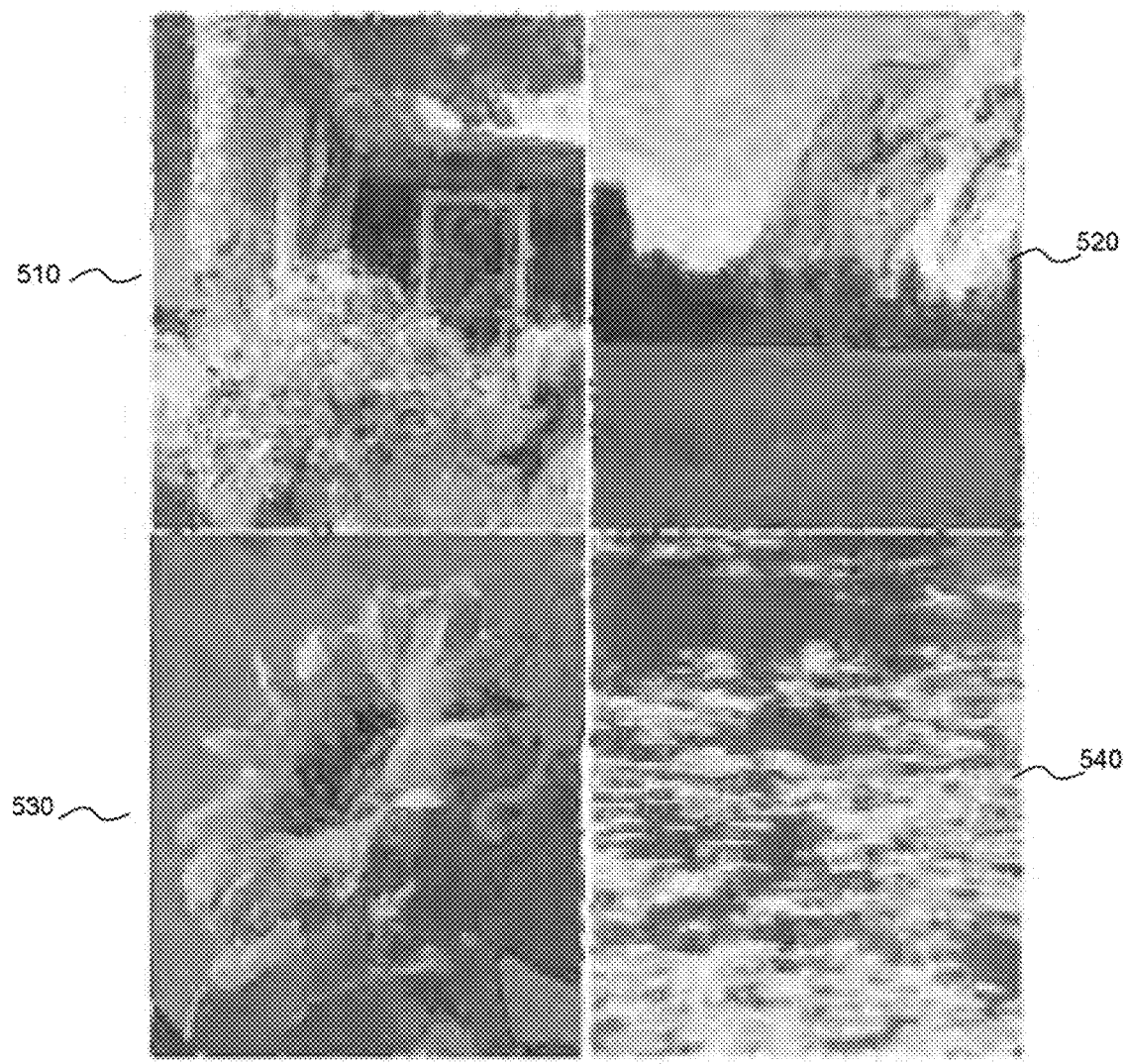
FIG. 5 is a color image of exemplary renderings in accordance with an embodiment.

FIG. 5 contains four exemplary renderings 510-540 emulating the watercolor painting style of Paul Cézanne, in accordance with method 100. These watercolor painting renderings exhibit smooth brushes and a light silhouette. Such a style may render images 510, 520, and 530 well, but may lose detail on images including smaller structures, such as image 540.

Figure 6:
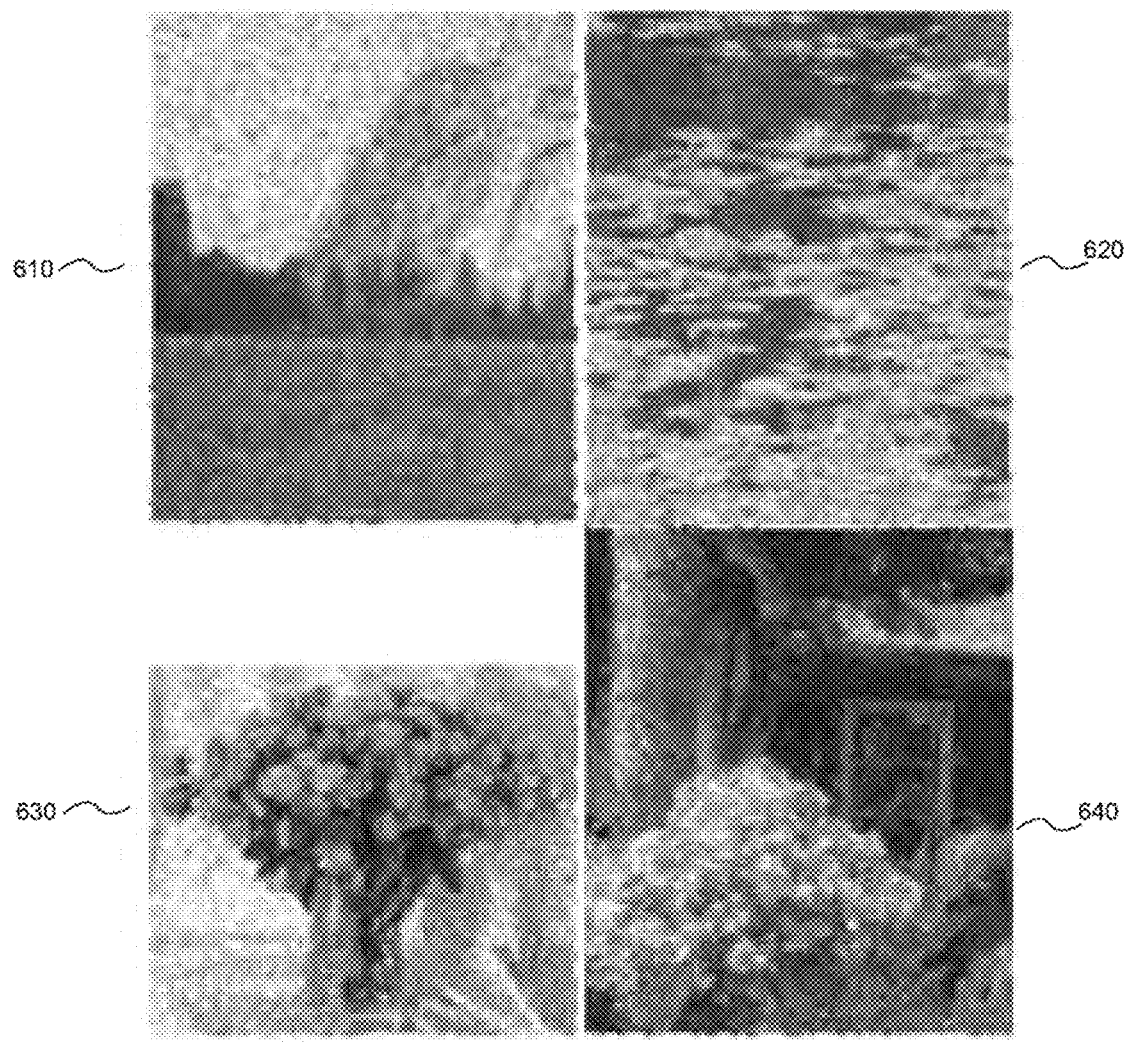
FIG. 6 is a color image of exemplary renderings in accordance with an embodiment.

FIG. 6 displays four exemplary renderings 610-640 emulating the oil painting style of Claude Monet. These oil paintings exhibit less obvious patchy strokes, and a more overall blurred effect. Further, the procedural painting system may adjust the saturation and brightness parameters to match the Monet style for renderings 610-640.

Figure 7:
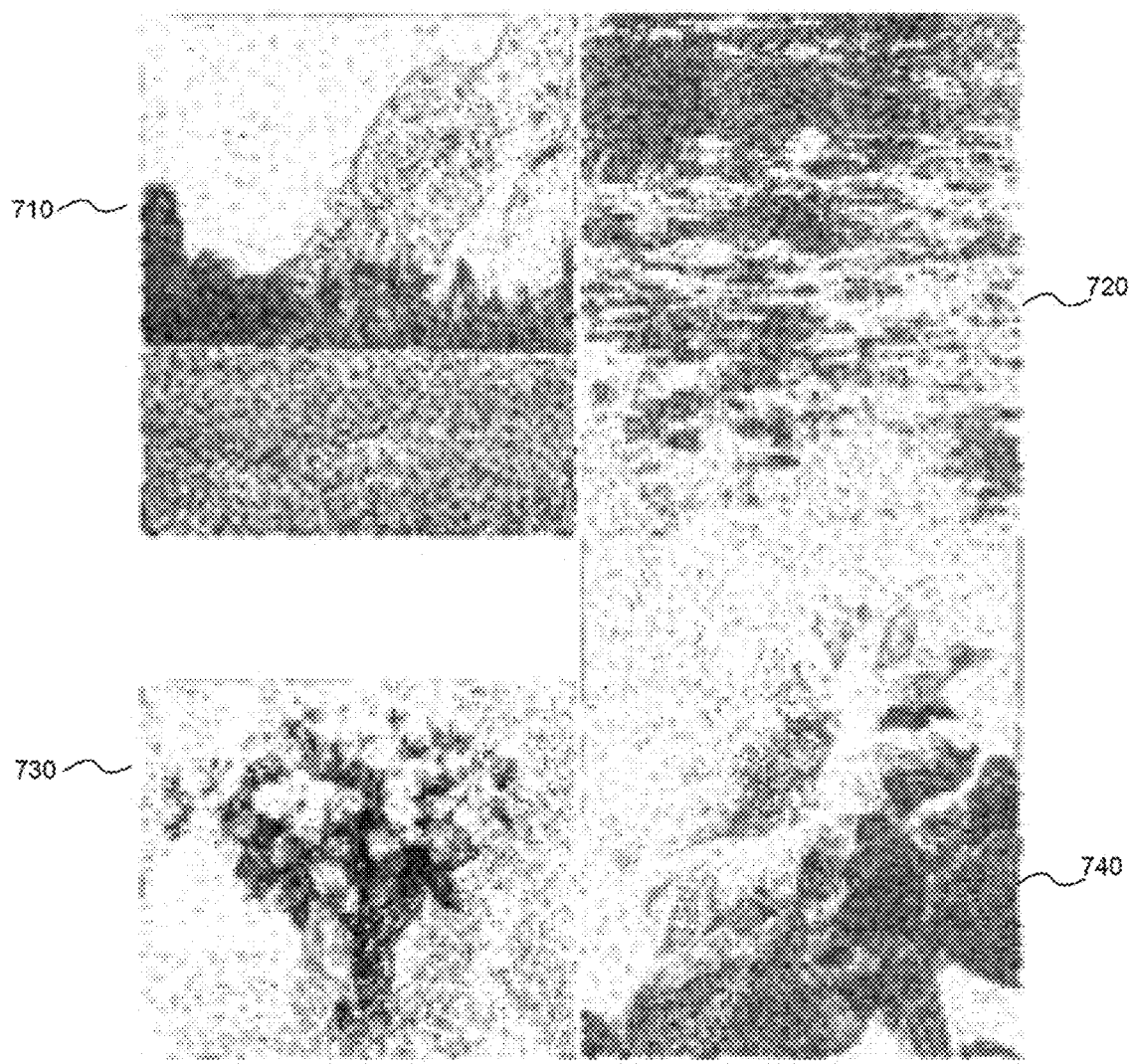
FIG. 7 is a color image of exemplary renderings in accordance with an embodiment.

FIG. 7 displays four exemplary renderings 710-740 emulating a pencil sketch style. Certain renderings 710-740 may appear over-saturated due to difficulties in edge detection.

Figure 8:
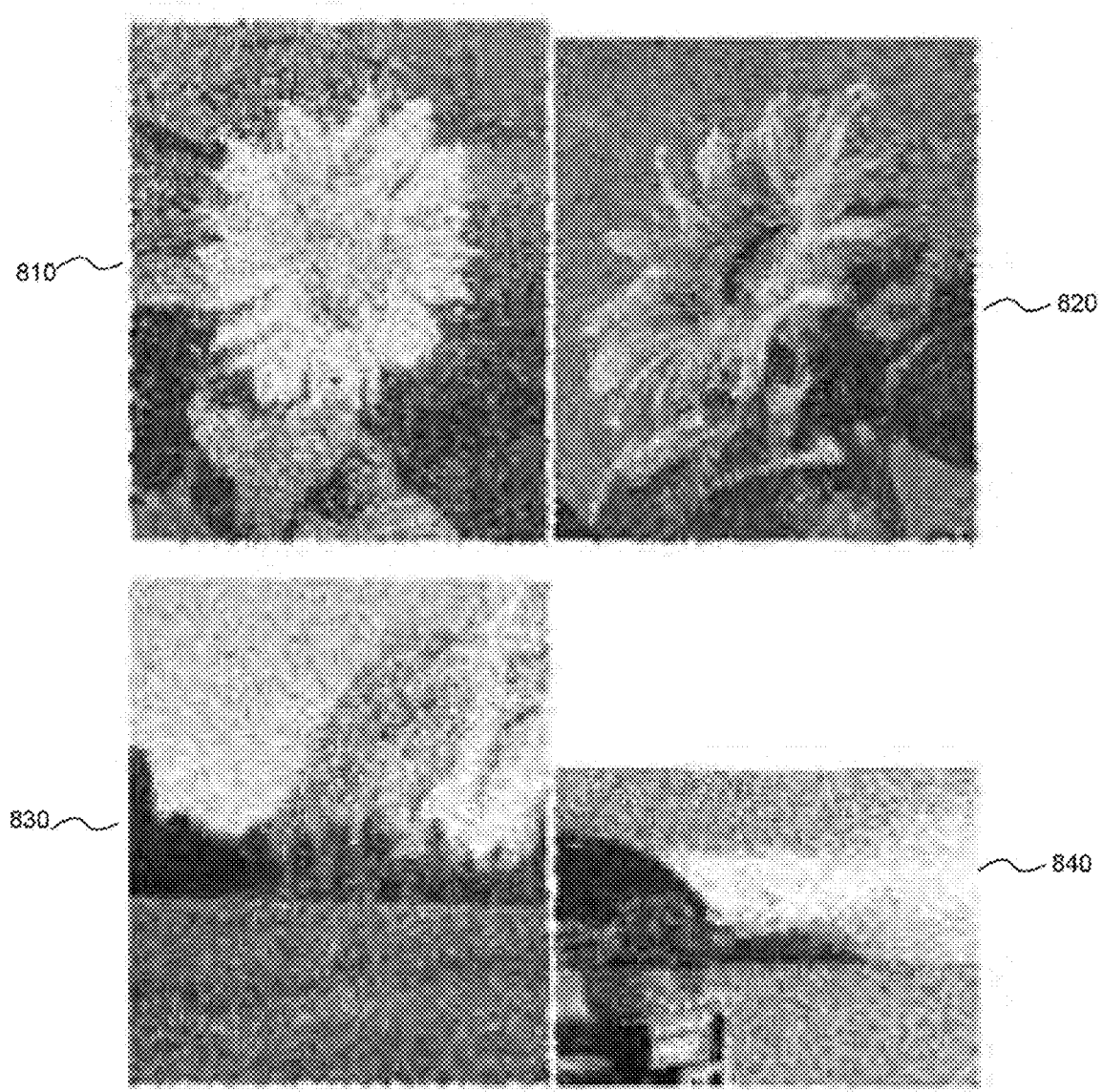
FIG. 8 is a color image of exemplary renderings in accordance with an embodiment.

FIG. 8 displays four exemplary renderings 810-840 emulating Van Gogh's oil painting style. These renderings exhibit obvious patchy brush strokes.

Figure 9:
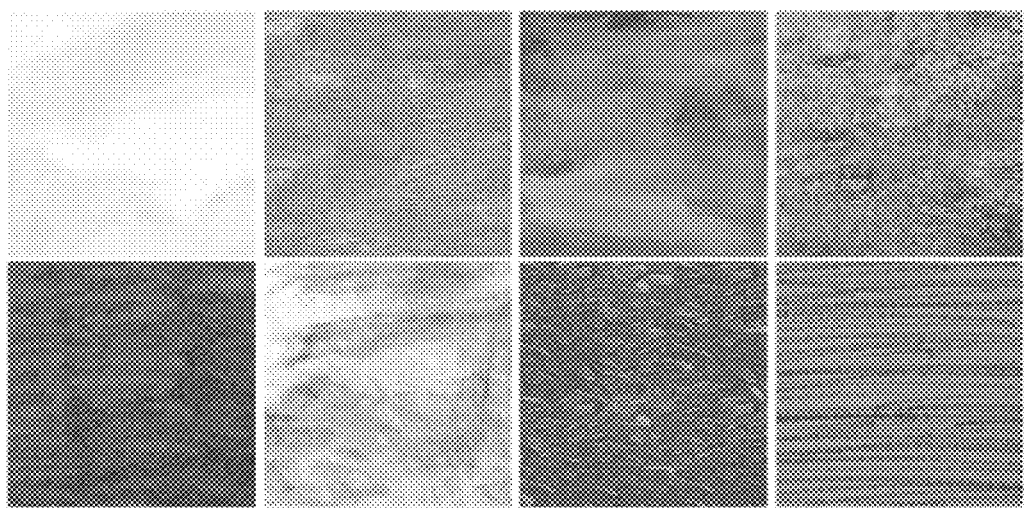
FIG. 9 is a color image of exemplary brush textures in accordance with embodiments.

In an embodiment, 11 brush textures from various paintings, sorted roughly by smoothness were used. Some examples of brush textures are shown in FIG. 9. While brushes for different styles were included, the optimizer may use them in novel ways. For example, the last brush texture for sketching may not be used. Instead, the optimizer may choose to use Van Gogh's patchy, strokes to mimic the pencil sketch style.

One particular style may not fit all images. Each of FIGS. 5-8 display a mixture of several good and bad/unsuitable cases. For example, Cézanne's style in FIG. 5 generates nice details with a combination of brush texture and silhouette. This style works well on smoother images, but loses details for smaller structures as in the lily pond.

As a further example, Monet's style as seen in FIG. 6 appears better on images with a darker tone. Saturation and brightness of images in the procedural painting system are automatically reduced to match the style.

In the example of FIG. 7, the procedural painting system chose Van Gogh's brush texture to emulate the pencil sketch style. However, some images appear over-saturated due to bad edge detection.

In the example of FIG. 8, Van Gogh's style shows a heavy patchy pattern. However, it may not possible for an embodiment to generate novel brush stroke rotations demonstrated in many of Van Gogh's works.

Figure 10A:
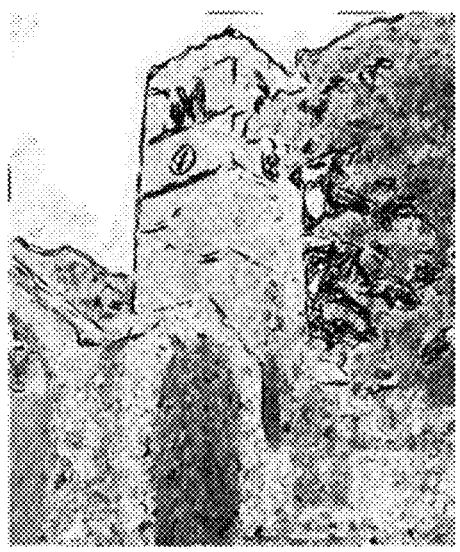
FIGS. 10A and 10B are color images of exemplary renderings in accordance with an embodiment.
Figure 10B:
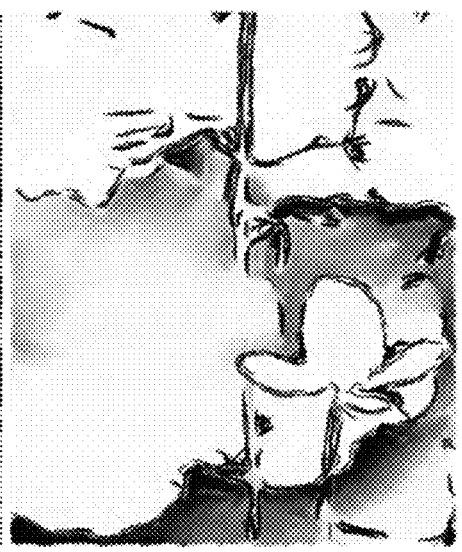

Certain unsuccessful results may be seen in FIGS. 10A and 10B. For example, the result with Edgar Degas' style in FIG. 10A captured the strong silhouette of his works. However, the texture was high in saturation, and lost the Degas coarse sketch-like background style. Further, in FIG. 10B, the result for the Chinese ink palming style washed out image details and only kept the color and ink silhouette. While the smoothed color does resemble ink stroke with large brushes, the overall effects are disappointing.

In an embodiment, AdaBoost training for each classifier takes about 20 seconds for each of the 50 stumps, based on the SPMK features with 10000-2000 dimensions. The average painting time for each image is in the order of 1-2 minutes. During each stage of the optimization, all parameters of the initial painting parameters may be modified randomly 200 times, then perturbed each parameter alone for 5 times.

The distribution of random perturbations may be linear over the radius, such that the chance for a point in parameter space to be picked is $O(R^{-N})$, where R is its distance to the starting configuration, and N is number of changing parameters of that stage. The optimization process may operate in parallel in practice since the painting for each configuration is independent.

Limitations of an embodiment may include the fact that the procedural painting system only can capture limited aspects of painting styles, such as brush textures, color tone, and texture smoothness. The procedural painting system may not capture important factors such as the stylish expression of objects using a deformed silhouette. Further, a fundamental difficulty is that it is generally impossible to obtain both a painting and a photograph of how the painted object appeared to the painter, which makes it impossible to learn the rules how a painter transforms the scene into a painting. For example, truly emulating the style of the Mona Lisa may be impossible, since no photograph of the subject of the painting is available.

While an embodiment may be automatic, a user may need to pay extra attention to certain aspects. First, an explicit regularization term is missing from our objective function. In an extreme case, the optimizer could change every pixel of a photo independently to turn it into a known painting from positive samples, thus to achieve a perfect score. In an embodiment, implicit regularization is applied by only allowing the painting system to choose from reasonable and mild operations. This includes manually limiting the ranges of variations for all parameters, and providing relatively smooth brush textures, such that the painting system does not generate results with extreme contrast or high-frequency noise. For example, a brush texture with large hue and saturation variation, combined with optimization, may lead to drastic results. Sometimes the painting system may fill the original image with high contrast patterns, which may achieve a good score by appearing like the background of some Van Gogh's paintings.

Figure 11:
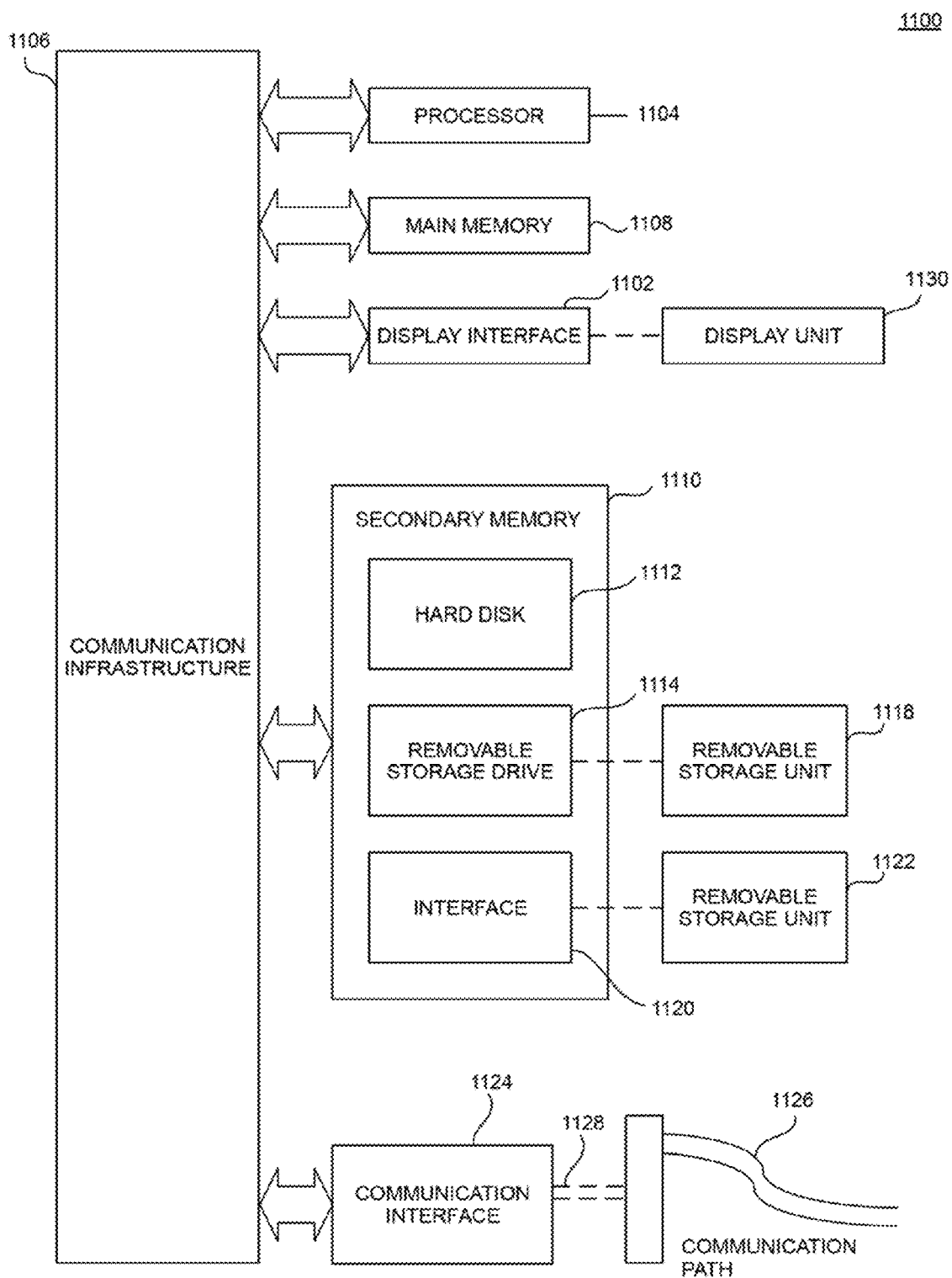
FIG. 11 is a diagram of a system in accordance with an embodiment.

FIG. 11 illustrates an example computer system 1100 in which an embodiment of the present invention, or portions thereof, may be implemented as computer-readable code. For example, system 300 may be implemented in computer system 1100 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-3.

If programmable logic is used, such logic may execute on a commercially available processing platform or a special purpose device. One of ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 1100. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1104 may be a special purpose or a general-purpose processor device. As will be appreciated by persons skilled in the relevant art, processor device 1104 may also be a single processor in a multi-core/multiprocessor system, such system operating alone, or in a cluster of computing devices operating in a cluster or server farm. Processor device 1104 is connected to a communication infrastructure 1106, for example, a bus, message queue, network, or multi-core message-passing scheme.

Computer system 1100 also includes a main memory 1108, for example, random access memory (RAM), and may also include a secondary memory 1110. Secondary memory 1110 may include, for example, a hard disk drive 1112, removable storage drive 1114. Removable storage drive 1114 may comprise a floppy disk drive, a magnetic tape drive, an optical disk drive, a flash memory, or the like. The removable storage drive 1114 reads from and/or writes to a removable storage unit 1118 in a well-known manner. Removable storage unit 1118 may comprise a floppy disk, magnetic tape, optical disk, etc., which is read by and written to by removable storage drive 1114. As will be appreciated by persons skilled in the relevant art, removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 may be in the form of signals, which may be electronic, electromagnetic, optical, or other signals capable of being received by communications interface 1124. These signals may be provided to communications interface 1124 via a communications path 1126. Communications path 1126 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1122, and a hard disk installed in hard disk drive 1112. Computer program medium and computer usable medium may also refer to memories, such as main memory 1108 and secondary memory 1110, which may be memory semiconductors (e.g. DRAMs, etc.).

Computer programs (also called computer control logic) are stored in main memory 1108 and/or secondary memory 1110. Computer programs may also be received via communications interface 1124. Such computer programs, when executed, enable computer system 1100 to implement the present invention as discussed herein. In particular, the computer programs, when executed, enable processor device 1104 to implement the processes of the present invention, such as the stages in the method illustrated by flowchart 100 of FIG. 1 discussed above. Accordingly, such computer programs represent controllers of the computer system 1100. Where the invention is implemented using software, the software may be stored in a computer program product and loaded into computer system 1100 using removable storage drive 1114, interface 1120, and hard disk drive 1112, or communications interface 1124.

Embodiments of the invention also may be directed to computer program products comprising software stored on any computer useable medium. Such software, when executed in one or more data processing device, causes a data processing device(s) to operate as described herein. An embodiment of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
   rendering a base output image with a procedural painting system controlled by one or more parameters, wherein the base output image is based on a received input image;
   calculating a score for the base output image, using a classifier trained to calculate a score based on how an image corresponds to a received painting style;
   determining a plurality of randomized sets of meta-parameters for the procedural painting system, wherein each meta-parameter comprises two or more parameters;
   rendering a plurality of intermediate output images by the procedural painting system, wherein the parameters of the procedural painting system for each intermediate output image in the plurality of intermediate output images are determined based on the plurality of randomized sets of meta-parameters;
   calculating a score for each intermediate output image in the plurality of intermediate output images, using the trained classifier; and
   identifying an optimal set of metaparameters based on the calculated score for each intermediate output image.

2. The method of claim 1, further comprising:
   determining a plurality of randomized sets of parameters for the procedural painting system;
   rendering a plurality of final output images by the procedural painting system, wherein the parameters of the procedural painting system for each final output image in the plurality of final output images are determined based on the plurality of randomized sets of parameters;
   calculating a score for each final output image in the plurality of final output images, using the trained classifier; and
   identifying an optimal final output image based on the calculated score for each final output image.

3. The method of claim 2, wherein the procedural painting system renders the base output image, at least one of the plurality of intermediate output images, and at least one of the plurality of final output images using curvilinear patches.

4. The method of claim 1, wherein the step of rendering a base output image further comprises:
   rendering an edge layer of the output image based on the input image; and
   rendering a patch layer of the output image based on the input image.

5. The method of claim 1, wherein the parameters comprise one or more of:
   a patch length; a patch x-y ratio; a patch texture; a brightness; a saturation shift to brush color; and a range of brightness and color variation from brush texture.

6. The method of claim 1, wherein the metaparameters comprise one of:
   a painting smoothness; an image colorfulness; and an edge importance.

7. The method of claim 1, further comprising:
   training a classifier to calculate a score based on how an image corresponds to a received painting style using a machine learning algorithm, wherein the training comprises:

receiving positive and negative samples for the received painting style;

extracting image patches from the positive and negative samples;

extracting one or more image features from the image patches; and using the machine learning algorithm to train the classifier to score image features of the received painting style.

8. The method of claim 7, wherein the image features comprise: a color feature based on a spatial pyramid matching kernel of the LAB color space; a color feature based on pixel color deviations from a blurred version of an image with a Gaussian radius of 3 pixels; an image gradient feature; and an image texton feature.

9. The method of claim 7, further comprising training a classifier using AdaBoost, and wherein the training further comprises using AdaBoost to train the classifier to score image features of the received painting style.

10. The method of claim 3, wherein the procedural painting system renders the base output image using curvilinear patches, based on a color distance between a canvas patch and a patch of the original image.

11. The method of claim 3, wherein the procedural painting system uses two different sizes of curvilinear patches.

12. A system, comprising:

one or more processors; and a memory in communication with the one or more processors, the memory containing instructions that cause the processor to:

receive a base output image with a procedural painting system controlled by one or more parameters, wherein the base output image is based on a received input image;

calculate a score for the base output image, using a classifier trained to calculate a score based on how an image corresponds to a received painting style;

determine a plurality of randomized sets of metaparameters for the procedural painting system, wherein each metaparameter comprises two or more parameters;

render a plurality of intermediate output images by the procedural painting system, wherein the parameters of the procedural painting system for each intermediate output image in the plurality of intermediate output images are determined based on the plurality of randomized sets of metaparameters;

calculate a score for each intermediate output image in the plurality of intermediate output images, using the trained classifier; and identify an optimal set of metaparameters based on the calculated score for each intermediate output image.

13. The system of claim 12, the memory containing further instructions that cause the processor to:

determine a plurality of randomized sets of parameters for the procedural painting system;

render a plurality of final output images by the procedural painting system, wherein the parameters of the procedural painting system for each final output image in the plurality of final output images are determined based on the plurality of randomized sets of parameters;

calculate a score for each final output image in the plurality of final output images, using the trained classifier; and identify an optimal final output image based on the calculated score for each final output image.

14. A non-transitory computer readable storage medium having instructions stored thereon that, when executed by a processor, cause the processor to perform operations including:

rendering a base output image with a procedural painting system controlled by one or more parameters, wherein the base output image is based on a received input image;

calculating a score for the base output image, using a classifier trained to calculate a score based on how an image corresponds to a received painting style;

determining a plurality of randomized sets of metaparameters for the procedural painting system, wherein each metaparameter comprises two or more parameters;

rendering a plurality of intermediate output images by the procedural painting system, wherein the parameters of the procedural painting system for each intermediate output image in the plurality of intermediate output images are determined based on the plurality of randomized sets of metaparameters;

calculating a score for each intermediate output image in the plurality of intermediate output images, using the trained classifier; and identifying an optimal set of metaparameters based on the calculated score for each intermediate output image.

15. The non-transitory computer readable storage medium of claim 14, the operations further comprising:

determining a plurality of randomized sets of parameters for the procedural painting system;

rendering a plurality of final output images by the procedural painting system, wherein the parameters of the procedural painting system for each final output image in the plurality of final output images are determined based on the plurality of randomized sets of parameters;

calculating a score for each final output image in the plurality of final output images, using the trained classifier; and identifying an optimal final output image based on the calculated score for each final output image.

16. The non-transitory computer readable storage medium of claim 15, wherein the procedural painting system renders the base output image, at least one of the plurality of intermediate output images, and at least one of the plurality of final output images using curvilinear patches.

17. The non-transitory computer readable storage medium of claim 14, the operations further comprising:

rendering an edge layer of the output image based on the input image; and rendering a patch layer of the output image based on the input image.

18. The non-transitory computer readable storage medium of claim 14, the operations further comprising training a classifier to calculate a score based on how an image corresponds to the received painting style, using a machine learning algorithm, wherein the training comprises:

receiving positive and negative samples for the received painting style;

extracting image patches from the positive and negative samples;

extracting one or more image features from the image patches; and using the machine learning algorithm to train the classifier to score image features of the received painting style.

* * * * *